C. W. Isbell.

Pipe Coupling.

No. 3,459. Reissued May 25, 1869.

Witnesses

Geo. W. Bigelow

Alonzo S. King

Inventor

Charles W. Isbell

United States Patent Office.

EDWARD GWYN, OF TIFFIN, OHIO, ASSIGNEE OF CHARLES W. ISBELL.

*Letters Patent No.* 29,281, *dated July* 24, 1860; *reissue No.* 3,459, *dated May* 25, 1869.

IMPROVEMENT IN GAS AND WATER-PIPE JOINTS.

The Schedule referred to in these Letters Patent and making part of the same.

*To all whom it may concern:*

Be it known that the following is a full, clear, and exact description of a new and improved Method of Constructing the "Joints of Gas and Water-Pipes," the invention of CHARLES W. ISBELL, formerly of the city and county of New Haven, in the State of Connecticut, but now of the city, county, and State of New York, reference being had to the accompanying drawings, making part of this specification, and in which—

Figure 1:
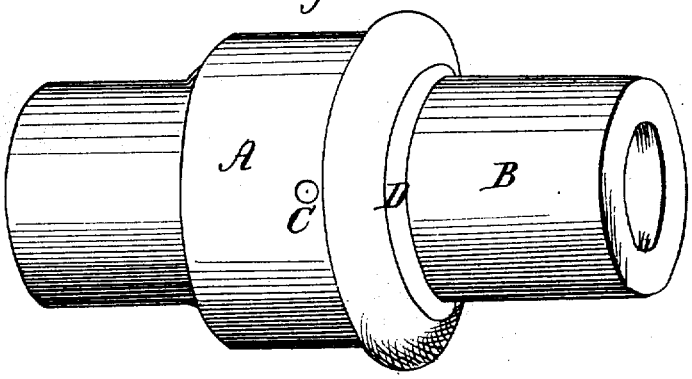
Figure 2:
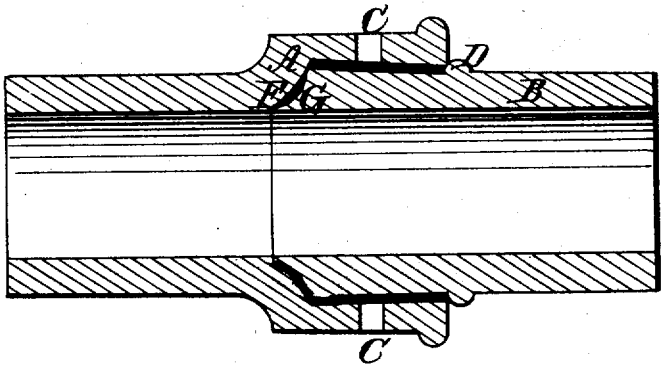

Figure 1 is a view in perspective of two pipes, or portions thereof, as joined in accordance with the invention, and Figure 2, a vertical central longitudinal section of the same.

Similar letters of reference indicate corresponding parts.

This invention consists in such a construction of the bell and spigot-ends of the pipes as that, on fitting the spigot into the bell, a conical or wedge-shaped cavity is formed around the spigot, or between the bell and spigot, so that, on filling the same with any suitable fusible metal or alloy, a tight joint and lock is established, which is only strengthened or made more secure on any attempt to separate the pipes; and The invention further consists in a certain combination of parts for carrying out said invention under one of its forms or modifications, as exhibited in the annexed drawing.

In said drawing—

A represents a socket or bell formed upon a section of pipe, to receive the spigot-end of another pipe, B.

C represents an upper opening through the bell.

D, a semicircular or other projection cast upon the periphery of the pipe B.

F is a shoulder at the bottom of the cavity of the bell A.

G shows the outline of the end of the pipe B.

The bell A may be provided with two openings, an upper and lower one, for the purpose hereinafter mentioned, and the diameter of its mouth should be of sufficient size to receive the spigot or spigot-end of the pipe B.

This diameter, as regards the interior construction of the bell, gradually increases toward the bottom or inner end of the bell-cavity, thus making said cavity conical or wedge-shaped, the same being smallest at the outside, and ending, it may be, in a shoulder, F, the outline of which is the arc of a circle.

The extreme end of the spigot of the pipe B is also represented as of the arc of a circle, but of different radius from that of the shoulder F, thus forming a recess between the shoulder and the end of the pipe B, when the same are in contact, that may be filled with clay, or other plastic substance.

At the point where the outer extremities of the arcs F and G meet, the diameter of the pipe B, or its spigot, corresponds with the mouth of the bell, or thereabouts, and then gradually decreases in an outward direction until it is the same as the main sections of the pipe, or nearly so, thus making it also wedge-formed or dovetailing, and leaving a space between the bell and spigot, into which is poured the fusible packing.

D is an annular projection, of semicircular or other suitable form in its cross-section, on the pipe B.

This projection is made larger than the space to be filled with the fusible packing, and is in such position upon the periphery of the pipe B as to close tightly the mouth of the bell when the end of the pipe B, or extremity of its spigot, is made to bear against the shoulder F.

By this construction, viz, a wedge-shaped cavity in the bell, with an outward curved shoulder and the pipe B, also wedge-formed, with a curved tapering end, the sections of pipe are made absolutely self-centring and unyielding under all circumstances.

In order to make the joint ready for service, a ring of clay, or other suitable plastic substance, may be laid upon the curve G of the spigot-end of the pipe B, to prevent the flow of the fusible packing into the body of the pipe or pipes.

The spigot-end of the pipe B is then pushed into the bell A until the end bears against the shoulder F, and the semicircular or other projection D closes the mouth of the bell.

The lower opening C is then closed, and the fusible packing, formed of lead, or any suitable metal or alloy, and which may be a composition of sulphur and red lead, that expands in cooling from a melting-heat, is poured into the upper opening C until the cavity between the bell and the spigot is filled, thus insuring a tight joint, while, owing to the wedge-shape of said cavity, the pipes cannot be drawn asunder until the packing has again been melted and drawn off at the lower opening C, which may be done whenever it is necessary to take up the pipe or pipes.

By this construction, a perfect safeguard against the escape of water and gas from the joints of pipes is secured, by making it impossible for the pipes to draw apart. Increased strength also is secured, and there need be no groove or chamber cutting into the substance of the pipe; likewise, said pipes are made self-centring, and they may be easily taken up without injury.

Among the general advantages incidental to such construction, may be mentioned economy of time, labor, and material.

It remains only to remark, in conclusion, that while of course no claim is here made to making a space for packing between the bell and spigot, nor yet any construction to merely form a cement-groove or chamber, the details of construction under this invention may be variously modified without departing from the distinguishing character of it.

Especially is this true as regards the extreme end or portion of the spigot, and back portion of the bell; also, as regards the provision for introducing and drawing off the packing, whether the same be a fusible metal or alloy, or a suitable composition or cement; likewise as regards the provision or absence of the annular projection on the spigot covering the mouth of the bell; but in any case it is important that the spigot and bell should be so constructed as to make the pipes self-centring and absolutely necessary, in all instances, that the packing-space around the spigot, commencing at the mouth of the bell and extending for a greater or less distance in direction of the length of the spigot, should be of a tapering or wedge-like character, increasing in diameter as it recedes from the mouth of the bell, to effect which it is essential that one at least of the two surfaces, as formed by the interior of the bell and exterior of the spigot, should be tapering, as described, and the other surface be suitably formed or prepared to produce a wedge-like tightening-character to the joint, or its packing, on attempting to draw the pipes apart, as specified, which is the effect produced by both the spigot and bell tapering from the mouth of the latter, as described.

What is here claimed, and desired to be secured by Letters Patent, is—

1. The combination of the spigot and bell, constructed to taper in reverse directions, as regards their contiguous surfaces, and in relation to or from the mouth of the bell, essentially as specified.

2. A pipe-joint, substantially as herein described, by constructing the spigot and bell, so that on fitting two lengths or sections of pipe together, they are made self-centring and leave a packing-space around the spigot, of a wedge-like form or character, increasing in diameter from the mouth of the bell, essentially as and for the purpose or purposes herein set forth.

3. The combination, with the reversely-tapering bell and spigot, of the shoulder F to the inner portion of the bell, and curved extremity G to the inner end of the spigot.

4. The combinations of the openings C C and annular projection D with the reversely-tapering bell and spigot, substantially as shown and described.

Witnesses: E. GWYN.

J. W. COOMBS,

FRED. HAYNES.